United States Patent [19]

Talo

[11] Patent Number: 4,501,230
[45] Date of Patent: Feb. 26, 1985

[54] RETRACTING AND LOCKING ANIMAL LEASH

[76] Inventor: Arnold T. Talo, 16522 Monroe La., Huntington Beach, Calif. 92647

[21] Appl. No.: 456,829

[22] Filed: Jan. 10, 1983

[51] Int. Cl.³ ............................................. A01K 27/00
[52] U.S. Cl. .................................................. 119/109
[58] Field of Search ................. 119/109; 242/107.4 R, 242/107.6, 107.3

[56] References Cited

U.S. PATENT DOCUMENTS

| | | | |
|---|---|---|---|
| 2,047,703 | 8/1953 | Hayes | 119/109 |
| 2,217,323 | 10/1940 | Sacuett | 119/109 |
| 2,222,409 | 11/1940 | Gottlieb | 119/109 |
| 2,250,171 | 7/1941 | Wilkins | 119/109 |
| 2,314,504 | 3/1943 | Lifchultz | 119/109 |
| 2,919,676 | 1/1960 | Schneider | 119/109 |
| 3,233,591 | 2/1966 | Rogers | 119/109 |
| 3,693,596 | 9/1972 | Croce | 119/109 |
| 4,018,189 | 4/1977 | Umphries | 119/109 |
| 4,202,510 | 5/1980 | Stanish | 242/107.4 R |
| 4,269,150 | 5/1981 | McCarthy | 119/109 |

Primary Examiner—Jay N. Eskovitz
Attorney, Agent, or Firm—Hubbard & Stetina

[57] ABSTRACT

A hand-held apparatus which dispenses, retracts and locks an animal leash in a desired position is disclosed characterized by a spool housing sized to store a length of cord and a handle portion adapted to be grasped in the hand of a user. The spool housing rotably mounts a spool having the length of cord wrapped thereabout with the distal end of the cord being attachable to an animal collar. A coil spring is mounted between the spool and spool housing to continuously bias the length of cord in a retracted position about the spool. A high strength locking mechanism adapted to selectively apply friction to the spool and positively prevent the cord from being dispensed or retracted from the spool is provided which is actuable by way of a trigger lever formed on the handle portion of the housing. A cam actuator stop is additionally provided to maintain the locking mechanism in a locked orientation.

8 Claims, 5 Drawing Figures

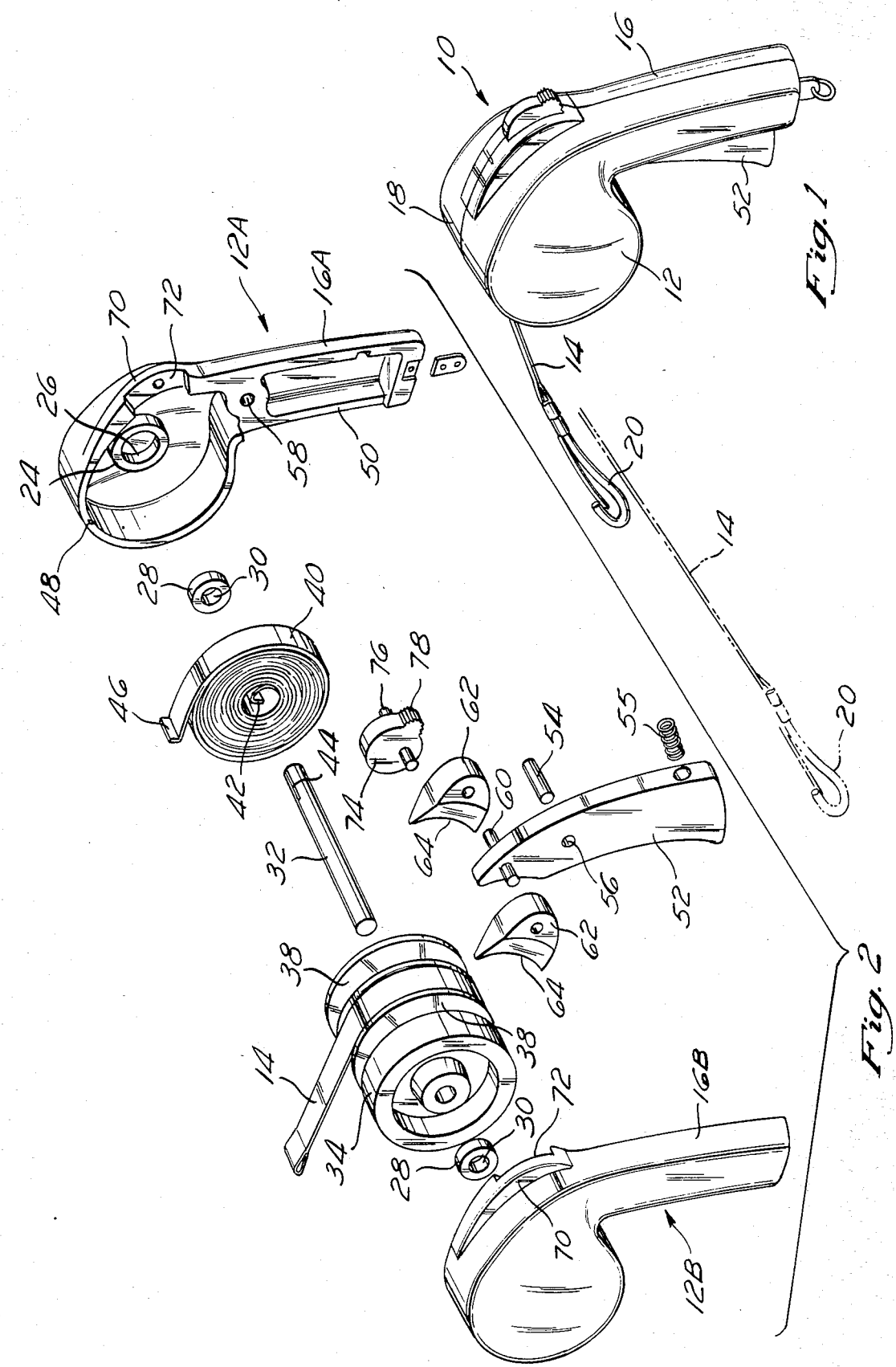

RETRACTING AND LOCKING ANIMAL LEASH

BACKGROUND OF THE PRESENT INVENTION

The present invention relates to animal leashes and, more particularly, to an improved hand-held apparatus which dispenses, retracts and locks an animal leash in a desired position.

As is well known, it is customary practice to utilize a leash when exercising domestic pets such as dogs. Typically, prior art leashes have comprised an elongate chain or leather strap having one end adapted to be attached to the animal and the other end formed in a looped configuration adapted to be grasped by the hand of the user. By maintaining a grip on the looped end of the leash, the user may restrain the animal within suitable limits of the user. Although such prior art leashes have proven generally effective for their intended purpose, they possess inherent deficiencies which have detracted from their overall effectiveness.

Foremost of these deficiencies associated with the prior art leashes has been their inability to provide means for rapidly increasing or decreasing the length of the leash to suit the particular animal control situation. As such, it has heretofore been common practice for a user to wind the leash about his or her hand which is typically difficult to accomplish and often causes discomfort to the user's hand. Further, the prior art leashes have been highly susceptible to becoming tangled and have proven awkward in use often becoming wrapped about trees, fence posts, limbs and the like. In addition, due to their substantial length, the prior art leashes have been difficult to store in an organized manner when not in use.

Although these above-referenced deficiencies have been recognized to a limited extent in the prior art, the proposed retractable animal leash devices to date such as those disclosed in U.S. Pat. Nos. 3,693,595 Croce, et al, 2,919,676 Schneider, 2,647,703 Hayes, 2,222,409 Goattleib, 3,233,591 Rogers, et al, 4,018,189 Umphries, et al, 4,202,510 Stanish, 4,269,150 McCarthy, 557,832 Knight, 2,250,171 Wilkins, and 2,314,504 Lifchultz have either comprised extremely complicated devices which have been expensive to purchase and difficult to manipulate during operation or structurally unsound devices incapable of adequately controlling large domestic animals.

As such, there exist a substantial need in the art for an improved animal leash device which is relatively low-cost, easy to carry and manipulate, and possesses sufficient strength to control even large domestic animals.

SUMMARY OF THE PRESENT INVENTION

The present invention specifically addresses and alleviates the above-referenced deficiencies associated in the art by providing an improved hand-held apparatus which dispenses, retracts and locks an animal leash in a desired position. More particularly, the present invention comprises a hand-held device formed to include a spool housing and handle portion. The spool housing rotably mounts a spool having a length of cord wrapped thereabout with the distal end of the cord being adapted to be attached to an animal collar. A coil spring is mounted between the spool and spool housing to continuously bias the length of cord in a retracted position about the spool. A high strength locking mechanism adapted to selectively apply friction to the spool and, hence, positively prevent the cord from being dispensed or retracted from the spool is provided which is actuable by way of a trigger lever formed on the handle portion of the device. A cam actuator stop is additionally provided to permit the locking mechanism to be easily maintained in a locked orientation.

In operation, a user may attach the distal end of the cord to an animal and merely hold the handle portion of the device wherein the animal may freely dispense the length of the cord off the spool. Due to the spring mounted on the spool, the cord is continuously maintained taut between the user and the animal. When the user desires to prevent any additional length of cord from being dispensed by the animal, the user merely actuates the trigger lever and may lock the same in position by way of a cam wherein the spool is prevented from any further rotational movement.

As such, the device of the present invention may be easily held and manipulated during use and provides a high strength locking mechanism effective for the control of even larger animals. Further, the cam lock mechanism provided on the device of the present invention maintains the locking force on the cord and thereby enables the device to be attached to a permanent anchoring post if desired.

DESCRIPTION OF THE DRAWINGS

These as well as other features of the present invention will become more apparent upon reference to the drawings, wherein:

FIG. 1 is a perspective view of the retracting and locking animal leash device of the present invention;

FIG. 2 is an exploded perspective view of the retracting and locking animal leash device of the present invention;

DETAILED DESCRIPTION OF THE PREFERRED EMBODIMENT

Figure 3:
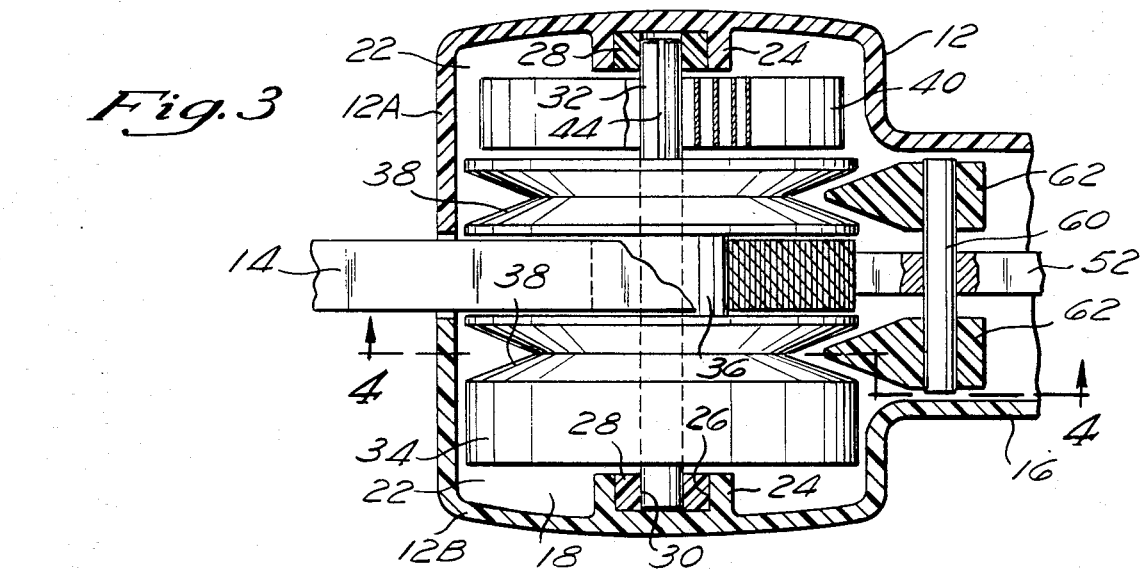
FIG. 3 is a cross-sectional view taken about lines 3—3 of FIG. 4.

Referring to FIG. 1, there is shown the improved retracting and locking animal leash device 10 of the present invention composed generally of a housing 12 and leash cord 14 extensible outward from one end of the housing (as indicated by the phantom lines in FIG. 1). The housing 12 is formed having an elongate handle portion 16 adapted to be grasped in the hands of a user (not shown) and a generally cylindrical spool/cord reservoir portion 18 from which the cord 14 extends.

In the preferred embodiment, the housing 12 is formed of a cast metal or molded plastic material and is preferably fabricated as a pair of mating housing segments 12A and 12B. The cord 14 comprises an elongate strap formed of a plastic or fabric weave material having approximate dimensions of one-half inch by one-sixteenth inch by fifteen feet. The distal end of the cord 14 is preferably provided with a fastener 20 which may be rapidly attached to a collar (not shown) worn about the animal to be controlled (not shown).

Referring to FIG. 2, the detailed construction of the individual components of the retracting and locking animal leash 10 of the present invention may be described. As depicted, the housing segments 12A and 12B are both formed having a generally cylindrical shaped void 22 which when both housing segments 12A and 12B are assembled, form the spool/cord reservoir portion 18 of the device 10. The central portion of each of the voids 22 is provided with a raised annular boss 24 which extends a short distance inwardly into the void 22. The inside diameter 26 of each of the bosses 24 is sized to be slightly less than the outside diameter of a pair of bearings 28 such that the bearings 28 may be press fit and retained within the diameter 26 of each of the bosses 24. In the preferred embodiment, the bearings 28 are formed of a teflon or delrin material; however, other suitable bearing or bearing material may be utilized.

The inside diameter 30 of each of the bearings 28 is sized to rotably receive or journal the distal ends of a spool shaft 32 which extends axially through the interior of the voids 22. The shaft 32 is rigidly attached to a spool 34 which in the preferred embodiment is formed of a lightweight material such as aluminum. The spool 34 is formed having a reduced diameter section 36 centrally located along its axis, the width of which is sized to be slightly greater than the width of the cord 14 such that the cord 14 may be wrapped about itself within the reduced diameter section 36. As will be recognized, the innermost end (not shown) of the cord 14 is rigidly anchored to the spool 34 along the circumference of the reduced diameter section 36 to insure that the cord 14 will remain affixed to the spool 34.

Disposed on opposite sides of the reduced diameter section 36 is a pair of generally conical-shaped cylindrical or peripheral recesses 38 which as will be explained in more detail infra, serve to provide a frictional engagement surface for locking the spool in a desired position. A coil spring 40 is additionally housed within the void 22 extending radially outward about the axis of the shaft 32. The inner end 42 of the spring 40 is captured within a slot 44 formed on one end of the shaft 32 while the outer end 46 of the spring 40 is anchored to the housing segment 12A as by way of a similarly formed slot 48 formed within the void 22. As will be recognized, although in the preferred embodiment only a single spring 40 is utilized, a pair of springs 40 may be disposed on opposite sides of the spool 34 when a greater rotational biasing force for the spool 34 is desired.

The elongate handle portion 16A and 16B of the housing segments 12A and 12B are each formed to include a recess 50 which extends laterally into the handle portions 16A and 16B and is sized to receive an elongate lever or trigger 52. The trigger 52 is pivotally attached to the housing segments 12A and 12B by way of a pin 54 extending through a mating aperture 56 formed within the trigger 52 and journaled within complimentary formed apertures 58 formed in housing segments 12A and 12B. An additional mounting pin 60 is provided adjacent the uppermost end of the trigger 52 which serves to pivotally mount a pair of brake pads 62 disposed on opposite sides of the lever 52 and preferably formed of a frictional material. The distal ends of the brake pads 62 are formed in a complimentary configuration to the conical-shaped recesses 38 of the spool and include a concave apex 64 such that the pads 62 may selectively engage the recesses 38 upon pivotal movement of the trigger 52 and apply a strong and consistent frictional force against the spool 34.

Each of the housing segments 12A and 12B additionally include a curvilinear shaped protrusion 70 adjacent the transition from the spool reservoir portion 18 and handle portion 16. An aperture 72 is formed in each of the protrusions 70 and is sized to receive a cam member 74 therein. The cam member 74 is pivotally mounted to the housing segments 12A and 12B by a pin 76 which is eccentrically positioned upon the cam member 74. A small knurled knob or handle 78 is additionally provided on the cam member 74 which serves as a gripping surface for actuation of the cam member 74.

Figure 4:
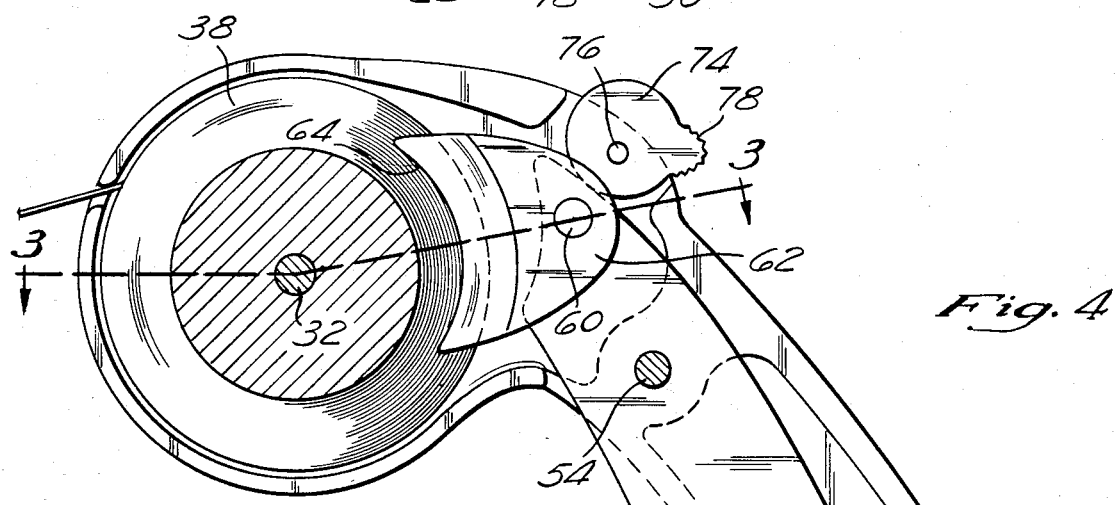
FIG. 4 is an elevational view of the retracting and locking animal leash device of the present invention depicting the locking mechanism in an unlocked orientation.
Figure 5:
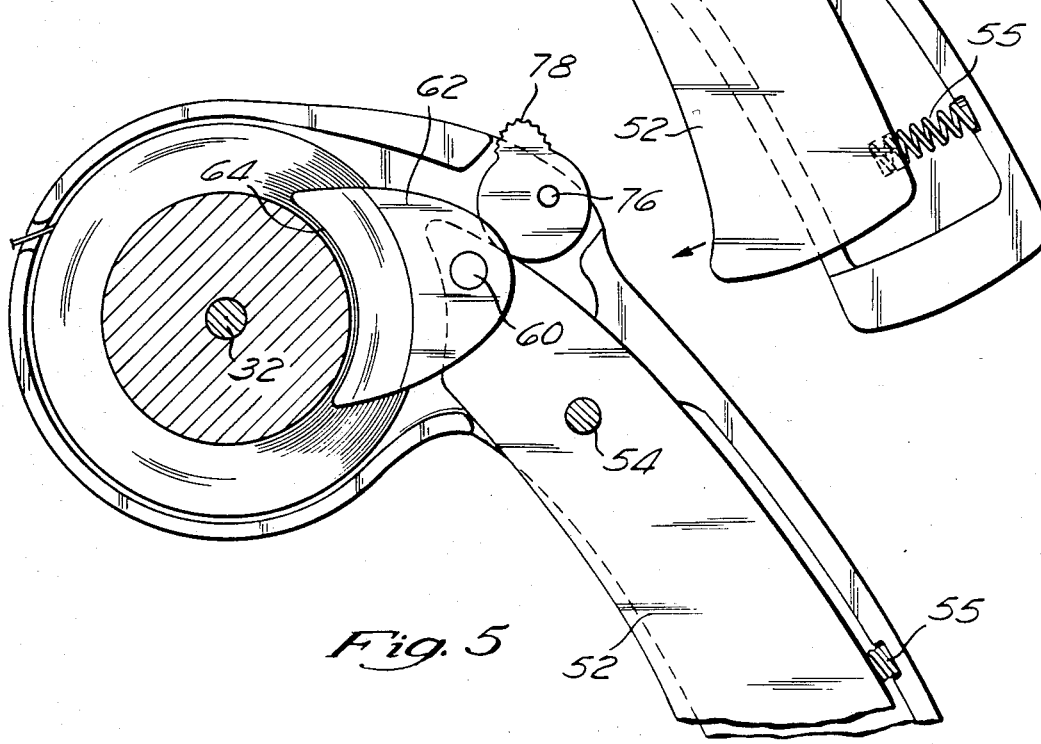
FIG. 5 is a elevational view of the retracting and locking animal leash device of the present invention depicting the locking mechanism in its locked orientation.

With the structure defined, the operation of the improved retracting and locking animal leash 10 of the present invention may be described with particular reference being made to FIGS. 3 through 5. In a normal operating mode, it will be recognized that the trigger 52 is biased by a return spring 55 in a clockwise direction (as indicated by the arrow in FIG. 4) wherein the brake pads 62 are spaced from engagement with the conical-shaped recesses 38 formed in the spool 34. Due to the biasing force of the coil spring 40 in the normal operating mode, the spool is continuously urged in a clockwise rotation as viewed from FIG. 4 wherein the cord 14 is maintained in a fully retracted position.

When the animal (not shown) is attached to the distal end of the cord 14 overcomes the biasing force of the spring 40, the spool 34 and spool shaft 32 is free to rotate in a counterclockwise rotation as viewed in FIG. 4 wherein the cord 14 is paid out or extended from the spool 34. Alternatively when the animal on the leash decreases its spacial relationship from the device 10 of the present invention, the spring 40 serves to automatically retract the cord 14 such that the cord 14 is continuously maintained taut between the device 10 and animal (not shown).

When it is desired to prevent any further extension of the cord 14 from the device 10, the user need only squeeze the trigger or lever 52 to compress the trigger return spring 55 from its fully extended position illustrated in FIG. 4 to its fully compressed position illustrated in FIG. 5 and cause the trigger to pivot inwardly within the handle portion 16 of the device 10. During this movement of the trigger 52 about its pivot pin 54, the uppermost end of the trigger 52 moves towards the spool 34 causing the brake pads 62 to contact the conical-shaped recesses 38 formed in the spool. Due to each of the brake pads 62 being pivotally mounted about a common shaft 60, during initial engagement of the brake pads with the recesses 38, the brake pads are permitted to moderately float and thus tangentially self-align with the recess 38.

It is an important feature of the present invention that the brake pad 62 contact an extremely large surface area of the conical-shaped recesses 38 such that a consistent and extremely strong frictional engagement force may be applied to the spool 34. As such, when the brake pads 62 contact the conical-shaped recesses 38, any further payout or retraction of the cord 14 from the device 10 is positively eliminated. Thus, by way of the apparatus 10 of the present invention, a user may easily control, i.e. restrain even a large animal.

To eliminate the requirement of the user constantly applying a squeezing force to the trigger 52 to maintain the locking force upon the spool 34, the present invention permits the brake pad 62 to be maintained in frictional engagement with the recesses 38 by manipulation of the cam member 74. More particularly, it will be recognized that the cam member 74 is sized and positioned to contact the uppermost edge of the trigger 52 and, hence, by manual rotation of the cam member 74 about its eccentric axis 76, the cam member serves to maintain the trigger 52 in its fully compressed orientation.

Alternatively, when it is desired to release the trigger mechanism, a user may merely grip the knurled knob portion 78 of the cam member 74 and rotate the same in a clockwise direction returning the cam member 74 from its locked orientation indicated in FIG. 5 to its unlocked orientation indicated in FIG. 4. Thus, it will be recognized that the cam member 74 permits the device 10 to be maintained in a locked configuration and further permits the device 10 to be attached to a permanent anchor as by way of an eyelet 15 (as shown in FIG. 1) and maintain the animal in the desired position.

Although in the preferred embodiment certain material, sizes and configurations have been defined, those skilled in the art will recognize that various modifications can be made to the same wihout departing from the spirit of the present invention and that such modifications are clearly contemplated herein.

What is claimed is:

1. A retracting and locking animal leash device comprising:
   a housing having a handle portion adapted to be grasped in the hand of a user and a reservoir portion adapted to store an elongate leash;
   a spool rotably mounted within said reservoir portion;
   an elongate leash positioned about said spool and extensible from said reservoir portion;
   means positioned within said reservoir portion for biasing said spool in a rotational direction to continuously urge said leash in a retracted orientation about said spool;
   a pair of conical shaped pad members positioned within said reservoir portion actuable to frictionally engaging said spool and preventing rotation of said spool;
   a trigger level pivotally mounted to said handle portion for actuating said brake means into frictional engagement with said spool; and
   locking means cooperating with said trigger lever for selectively maintaining said brake means in engagement with said spool; said spool having a pair of perripheral recesses formed in a complimentary configuration to said pair of conical-shaped pad members and said pair of conical-shaped pad members being mounted to said trigger lever.

2. The device of claim 1 wherein said pair of conical-shaped pad members are pivotally mounted to said trigger lever to self-align with said peripheral recesses during engagement with said spool.

3. The device of claim 2 further comprising means for biasing said trigger lever in a first position wherein said pair of pad members are spaced from said peripheral recesses.

4. The device of claim 2 wherein said locking means comprises a cam mounted for rotational movement upon said housing.

5. The device of claim 4 wherein said cam is pivotally mounted to said housing upon an eccentric axis.

6. The device of claim 5 wherein said spool biasing means comprises a coil spring positioned within said reservoir portion.

7. The device of claim 6 wherein said housing is formed of a pair of mating housing segments.

8. The device of claim 7 wherein said trigger level extends along the length of said handle portion so as to be manipulated by the hand of said user.

* * * * *